Figure 1:
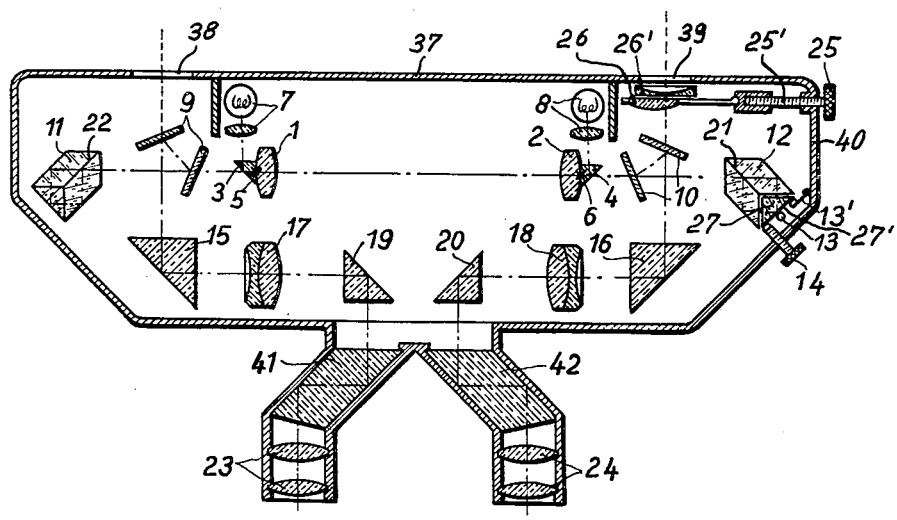

July 11, 1961  N. GÜNTHER  2,991,683
STEREOSCOPIC RANGE FINDERS
Filed Jan. 25, 1960

July 11, 1961  N. GÜNTHER  2,991,683
STEREOSCOPIC RANGE FINDERS
Filed Jan. 25, 1960  2 Sheets-Sheet 2

United States Patent Office 2,991,683
Patented July 11, 1961

2,991,683
STEREOSCOPIC RANGE FINDERS
Norbert Günther, Aalen, Wurttemberg, Germany, assignor to Carl Zeiss, Wurttemberg, Germany
Filed Jan. 25, 1960, Ser. No. 4,527
Claims priority, application Germany Jan. 23, 1959
5 Claims. (Cl. 88—2.7)

The invention relates to improvements in stereoscopic range finders provided with a luminous mark collimator for producing the measuring marks. The range finder is provided with two axially aligned collimator objectives connected each with a three-dimensional mark and also contains a device for illuminating these marks. The images of these marks are projected by two reflecting squares, each of which is arranged outside the collimator objectives, into the observation telescope proper of the stereoscopic range finder. Such stereoscopic range finders have the advantage that the luminous mark is always viewed in infinity which means that no correction of the stereoscopic range finder is necessary. A prerequisite of this so-called automatic correction of the instrument is, however, that the position of the collimator objectives and the size of the vertex angles of the reflecting squares remain always the same.

In a range finder provided with two axially aligned collimator objectives each of which has associated therewith a three-dimensional mark it has been proposed heretofore to arrange outside of each one of the two collimator objectives a reversible reflecting square, whereby each reflecting square produces a deflecting of 90°, and to provide outside of each one of said two reversible reflecting squares a fixed end mirror which reflects the light rays about an angle of 180°. One of the two end mirrors is suitably provided with a device for changing the deflection. When the vertex angle of one of the end mirrors is adjusted from its required size, there are produced two measuring mark images which appear to the observer as being arranged at a different distance from each other. By means of the mentioned adjusting device it is possible to bring the images of the measuring marks to the same distance so that therefore variations in the vertex angle of the two end mirrors will not falsify the measuring result.

The adjustment of this stereoscopic range finder takes place in this manner that after one measurement has been completed the two reversible reflecting squares are reversed about an angle of 90° and then another measurement is made. If in the measurement position I the two mirrors have, for instance, such a position that the light beams leaving the collimator objectives will first reach the end mirrors producing a deflection of 180° and are then deflected by the reflecting squares about an angle of 90° before the light reaches the observation portion of the telescopic range finder, then in this position the target will appear too close when there is a change in the vertex angle of one of the two reflecting squares of 90° deflection. In the measurement position II, i.e. after the reflecting squares have been reversed the light beam leaving the collimator objectives will reach the reflecting squares directly and will be deflected 90° toward the observation portion of the range finder. Since in this case the light deflected toward the observation portion of the range finder reaches said reflecting squares in opposite direction then in the measuring position I, the target appears at a distance which is too far away. The average between the two measured values is then the correct one.

Each of the two reversible reflecting squares producing a deflection of 90° is composed of two partially reflecting mirrors. One partially reflecting mirror of each of said reflecting squares is arranged in front of an aperture through which the rays coming from the target enter the range finder casing. In this manner the target rays penetrate the partially transparent mirrors of the two reflecting squares and pass directly into the observation part of the range finder.

The reflecting squares producing a deflection of 180° are each arranged outside of the reflecting squares producing a deflection of 90° and are constructed to have a roof edge effect. This has the result that the pupil of the light beam which reaches such a reflecting square is split so that in the exit pupil of the range finder two separated halves of the pupil of the measuring mark image appear. This effect, however, is not very disturbing as long as the exit pupil does not exceed the diameter of 1 millimeter, namely when the exit pupil of the instrument is substantially smaller than the eye pupil. If, however, the exit pupil of the range finder is greater, then the mark whose pupil portion lies outside the eye pupil will disappear when the observer moves his head either toward the right or toward the left.

It is an object of the present invention to improve the above described stereoscopic range finder in such a manner that the above described disadvantage does not appear. According to the present invention, this desirable improvement is obtained in that the stereoscopic range finder is provided in place of each one of the above mentioned 180° reflecting squares with $2n+2$ ($n=1, 2, 3, 4 \ldots$) mirror surfaces which serve for splitting the beams of light which come from each of the two collimator objectives into two partial light beams, for reflecting these two partial light beams in the same path but in opposite directions about 180° and for physically recombining the partial light beams at that point where the original beams of light entered. As a result of this improvement any pupil separation is avoided and the errors which were produced by such a separation do not occur.

The splitting of the light beams coming from each of the two collimator objectives into two partial light beams and the deflection of these partial light beams along the same but opposite path about 180° has the advantage that any possible errors in the position of the mirror surfaces resulting from exterior influences do not influence the measuring result. In such cases, both partial light beams are deflected about the same but opposite amounts so that the average value of these deflections remains always the same.

The mentioned mirror surfaces may be formed by suitably arranged mirrors or suitably constructed prisms. It is recommended to employ four reflecting mirror surfaces since by such a number of reflecting surfaces the desired result is obtained with the least amount of parts. It is, however, desired to point out that the number of the reflections of the partial light beams has to be always an even number.

The accompanying drawings illustrate a few embodiments of the stereoscopic range finder of the present invention.

Figure 2:
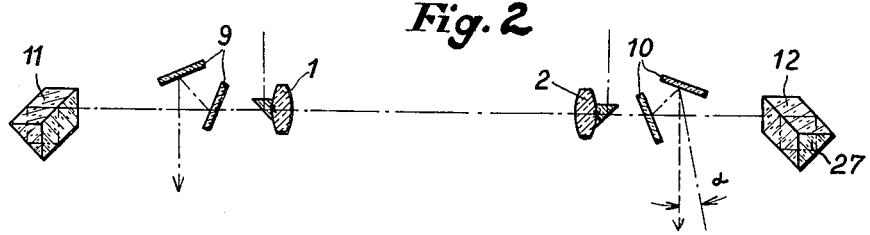
Figure 3:
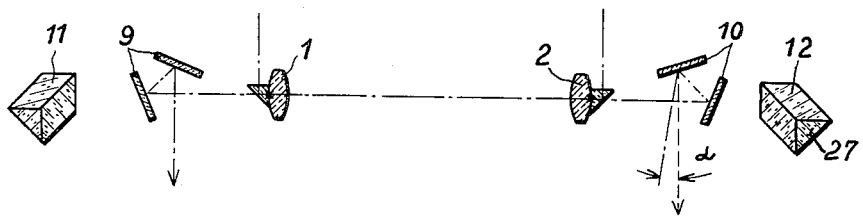
Figure 4:
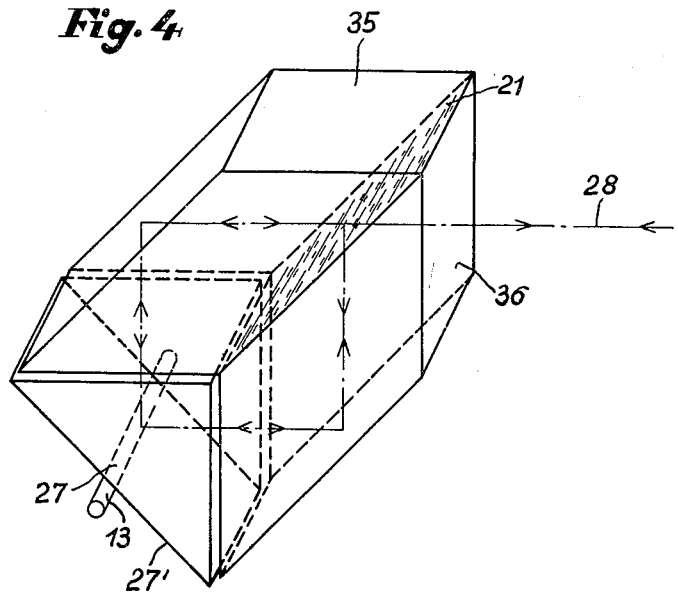
Figure 5:
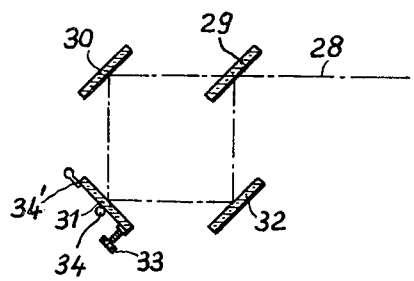

FIG. 1 illustrates diagrammatically a horizontal sectional view of a stereoscopic range finder, FIG. 2 illustrates diagrammatically the measuring position I of the luminous mark collimator with changed vertex angle of one of the reflecting squares providing a deflection of 90°, FIG. 3 illustrates the measuring position II of the luminous mark collimator with changed vertex angle of one of the reflecting squares providing a deflection of 90°, FIG. 4 illustrates an optical element consisting of a number of combined prisms for the deflection of the incident light about an angle of 180°, and FIG. 5 illustrates an optical arrangement consisting of a number of plane mirrors for deflecting the incident light about an angle of 180°.

Referring to the drawings, FIG. 1 illustrates diagrammatically the construction of a stereoscopic range finder in accordance with the invention. The collimator objectives 1 and 2 direct the light passing through the same in the illustrated measuring position into two elements 11 and 12. In the principal planes of the objectives 1 and 2, each of which also constitute the focal plane of the other objective, are arranged the measuring marks 5 and 6 which are illuminated by two sources of light 7 and 8 via the two prisms 3 and 4. The two elements 11 and 12 split the light which reaches the same into two partial light beams and the latter are deflected in the same but opposite direction about an angle of 180° and finally they are united at the place of the incident light beam. For the purpose of splitting and reuniting the light beams are employed the two semi-transparent surfaces 21 and 22.

The light beams pass from the elements 11 and 12 to the two 90° reflecting squares 9 and 10 and from there they enter the viewing portion of the range finder. The partial mirrors of the two 90° reflecting squares 9 and 10 are only semi-transparent and the upper partial mirrors are arranged in each case in such a manner that they will be penetrated by the light rays coming from the target.

The range finder proper consists of the two prisms 15 and 16 which are arranged spaced in rear of the target ray admitting openings 38 and 39 in the front wall 37 of the range finder casing 40, the two objectives 17 and 18, two additional 90° deflective prisms 19 and 20, two other deflecting prisms 41 and 42 and the two oculars 23 and 24. The measuring of the distance takes place by means of manually rotating and adjusting knob 25 attached to a threaded spindle 25' which is used in conventional manner for laterally displacing a positive lens 26 which cooperates with a negative lens 26'. Both lenses 26 and 26' are arranged in the path of the light ray coming from the target in rear of the opening 39.

The mirror surface 27' of the optical element 12 for the purpose of changing the deflecting angle is rotatably mounted about an axis 13 and is adjusted by means of a screw 14 or the like against the action of a spring 13'. By a rotative adjustment of the screw 14 it is possible to produce two measuring mark images which appear to the observer as being arranged at a different distance from each other. The difference between these two measuring mark images is adjustable by means of rotating the screw 14. In this manner it is possible to measure distance differences, for instance, for determining the aberration of impact of projectiles, when the screw 14 is connected by means of a measuring gear provided with a measuring scale which indicates distance differences. In addition, the adjustability created by the screw 14 may also be used for the purpose of correcting personal errors of the operator of the device and any jumping movements of the target, particularly during strong sun light which illuminates the territory. For this purpose the target during the measuring is adjusted between the two measuring mark images the distance of which can be changed as desired.

In FIG. 2 the luminous mark collimator of the stereoscopic range finder of the invention has been adjusted to the measuring position I whereby the vertex angle of the reflecting square 10 is shown to be not correct. In the illustrated case, the light beam coming from the reflecting square 10 deviates about an angle α from the optical axis of the observation part of the distance meter. This has the result that the measuring mark appears to be too close. The reflecting squares 9 and 10 are now reversed and assume the position as shown in FIG. 3. This is measuring position II. In this case the light beam coming from the reflecting square 10 also deviates about the angle α from the optical axis of the observation part. The deviation, however, is now arranged on the other side as the one shown in the measuring position I. The average value of the two measurements taken in the measuring positions I and II gives the correct result.

In order that this average value may be read at once on the distance scale, it is of advantage to provide means which transmit the displacement of the distance measuring elements 26, 26' to the distance scale during the control measurement to a value which is only one half of the one taken place during the conventional distance measurement. If, for instance, the transmission ratio between the adjustment knob 25 of the distance measuring member 26, 26' and the measuring scale in the measuring position I during the conventional distance measurement is 1:1, then one employs in the measuring position II during the measurement a transmission ratio 1:2. Since the difference between the conventional measurement and the control measurement is equal to the double measuring error, the distance scale in view of the changed transmission is displaced only about one half of this difference, namely about the amount of the measuring error, so that now the correct distance is indicated.

FIG. 4 illustrates the element 12 in an enlarged perspective view. As shown in this FIG. 4, the element consists of two rhombic prisms 35 and 36 which are cemented together along the surfaces 21. This prism embraces a rectangular prism 27 along its two short sides. The cemented surface 21 is semi-transparent reflective and, as shown in FIG. 1, forms an angle of 45° with respect to the incident light beam. The incident light beam 28 is split by the semi-reflective surface 21 into two partial light beams which pass along the same path, but in opposite direction, or they are reflected about an angle of 180°. The two partial light beams are finally recombined at the semi-reflective surface 21. It is obvious that by a tilting movement of the prism 27 about the axis 13 a change in the deflecting angle of the element 12 can be obtained.

FIG. 5 shows a mirror arrangement which corresponds to the element 12. This mirror arrangement consists of a semi-transparent mirror 29 which is inclined about an angle of 45° with respect to the inciden light beam 28 and which serves for light beam splitting and light beam recombination. The three other mirrors 30, 31, 32 form with the mirror 29 a square and deflect the partial light beams in the form of a closed loop. For a change of the angle of deflection a screw 32 is employed which adjusts the mirror 33 about the axis 34 against the action of a spring 34'.

In the described and illustrated device no pupil separation takes place because the semi-transparent surface which splits the incident light beam is also used to recombine the light beams. Accordingly, the stereoscopic range finder illustrated in FIG. 1 may also be used for measurements in which the exit pupil of the instrument is substantially larger than one millimeter, i.e. larger than the pupil of the human eye.

What I claim is:

1. In a stereoscopic range finder of the type including a casing having a front wall provided with two laterally spaced target ray admitting openings, two prisms within said casing and spaced rearwardly of said target ray admitting openings for deflecting the measuring rays into two axially aligned objectives, and means for deflecting the rays passing through said objectives into two oculars, the improvement comprising two coaxially arranged collimator objectives provided each with a three-dimensional mark arranged within said casing and between the axes of the target rays entering the openings in said front wall, means for illuminating said marks, reversible reflecting squares provided with partly transparent reflecting surfaces arranged one each in the path of the parallel light rays of each one of said collimator objectives and also between said openings and said prisms, said reflecting squares producing a reflection of 90°, and stationary optical elements arranged outside said optical squares in the extensions of the axes of said collimator objectives for producing a reflection of 180°, said optical elements having a plurality of reflecting surfaces which are provided for splitting the beam of light coming from the collimator objectives into two partial beams and reflect these partial beams along the same but oppositely directed paths about 180° and recombine these partial beams at the point of the incident beam of light.

2. In a stereoscopic range finder of the type including a casing having a front wall provided with two laterally spaced target ray admitting openings, two prisms within said casing and spaced rearwardly of said target ray admitting openings for deflecting the measuring rays into two axially aligned objectives, and means for deflecting the rays passing through said objectives into two oculars, the improvement comprising two coaxially arranged collimator objectives provided each with a three-dimensional mark arranged within said casing and between the axes of the target rays entering the openings in said front wall, means for illuminating said marks, reversible reflecting squares provided with partly transparent reflecting surfaces arranged one each in the path of the parallel light rays of each one of said collimator objectives and also between said openings and said prisms, said reflecting squares producing a reflection of 90°, and stationary optical elements arranged outside said optical squares in the extensions of the axes of said collimator objectives for producing a reflection of 180°, said optical elements having a plurality of reflecting surfaces which are provided for splitting the beam of light coming from the collimator objectives into two partial beams and reflect these partial beams along the same but oppositely directed paths about 180° and recombine these partial beams at the point of the incident beam of light, said reflecting surfaces include a semi-transparent mirror which is arranged at an angle of 45° with respect to the incident beam of light for splitting the latter into said two partial beams and for recombining the same, and three additional mirrors arranged to form with said semi-transparent mirror a square so that the reflected partial beams form closed loops of light.

3. In a stereoscopic range finder of the type including a casing having a front wall provided with two laterally spaced target ray admitting openings, two prisms within said casing and spaced rearwardly of said target ray admitting openings for deflecting the measuring rays into two axially aligned objectives, and means for deflecting the rays passing through said objectives into two oculars, the improvement comprising two coaxially arranged collimator objectives provided each with a three-dimensional mark arranged within said casing and between the axes of the target rays entering the openings in said front wall, means for illuminating said marks, reversible reflecting squares provided with partly transparent reflecting surfaces arranged one each in the path of the parallel light rays of each one of said collimator objectives and also between said openings and said prisms, said reflecting squares producing a reflection of 90°, and stationary optical elements arranged outside said optical squares in the extensions of the axes of said collimator objectives for producing a reflection of 180°, said optical elements having a plurality of reflecting surfaces which are provided for splitting a beam of light coming from the collimator objectives into two partial beams and reflect these partial beams along the same but oppositely directed paths about 180° and recombine these partial beams at the point of the incident beam of light, said reflecting surfaces of each said optical elements being formed by two rhombic prisms and a rectangular prism which is engaged by said two rhombic prisms which latter embrace the two short sides of said rectangular prism, the cemented face formed between said two rhombic prisms being semi-transparent and being arranged at an angle of 45° with respect to the incident beam of light.

4. A stereoscopic range finder as claimed in claim 2, including means for adjusting that one of said three mirrors about an axis which is arranged at a right angle with respect to said semi-transparent mirror.

5. A stereoscopic range finder as claimed in claim 3, including means for adjusting said rectangular prism to change the angular position of its reflection surface.

References Cited in the file of this patent
UNITED STATES PATENTS

| | | |
|---|---|---|
| 1,918,527 | Eppenstein | July 18, 1933 |
| 2,911,880 | Rantsch | Nov. 10, 1959 |